United States Patent [19]
Hessler et al.

[11] 3,769,741
[45] Nov. 6, 1973

[54] FISHING EQUIPMENT CARRIER

[76] Inventors: Albert Hessler, 3359 Pecos St.;
Lyston E. Bucklin, 3182 S. Gilpin,
both of Denver, Colo. 80211

[22] Filed: Oct. 5, 1971

[21] Appl. No.: 186,744

[52] U.S. Cl............................ 43/57.5 R, 206/45.15
[51] Int. Cl............................................... A01k 97/06
[58] Field of Search...................... 43/57.5 R, 25.2, 43/57.5 A; 206/66, 45.15, 45.2, 45.23

[56] References Cited
UNITED STATES PATENTS

| | | | |
|---|---|---|---|
| 1,863,047 | 6/1932 | Grimsley | 206/45.15 |
| 3,199,243 | 8/1965 | Caston | 43/57.5 R X |
| 3,512,295 | 5/1970 | LaBarge | 43/57.5 R |
| 3,461,599 | 8/1969 | Sylvester | 43/57.5 R |
| 940,132 | 11/1909 | Creasey | 43/57.5 R |
| 1,979,475 | 11/1934 | Knettles | 43/57.5 A X |
| 891,055 | 6/1908 | Frost | 43/57.5 R |

*Primary Examiner*—Louis G. Mancene
*Assistant Examiner*—James H. Czerwonky
*Attorney*—C. B. Messenger

[57] ABSTRACT

A fishing equipment support for convenient usage in storing, carrying and using items such as fish lures, bait, flies, hooks, etc. Lures are held and protected by pads of soft foam mounted on cover pieces that alternately fold to enclose or open to display the lures. A multi-element fastener system is provided that reverses to hold the support in closed or user configurations. Lightweight materials provide a flotation capability. The support includes a hinged divider element for interpositioning between the pads to prevent interference between lures disposed on the pads.

4 Claims, 8 Drawing Figures

PATENTED NOV 6 1973 3,769,741

INVENTORS.
ALBERT HESSLER
LYSTON E. BUCKLIN
BY
*Messenger*
ATTORNEY

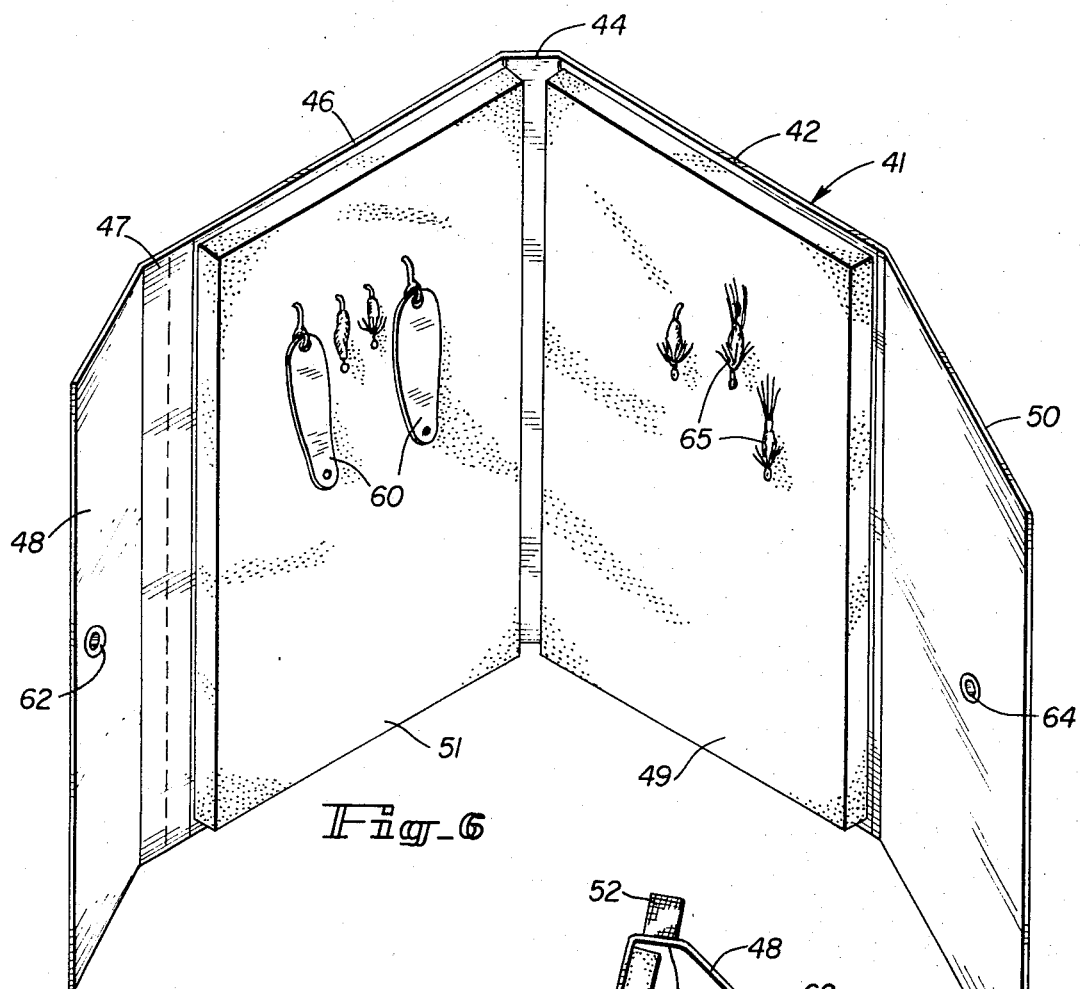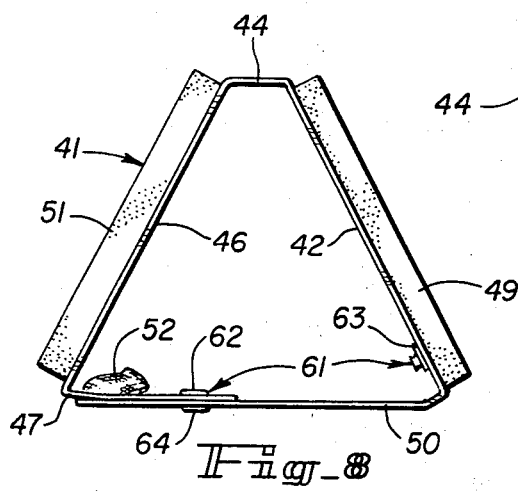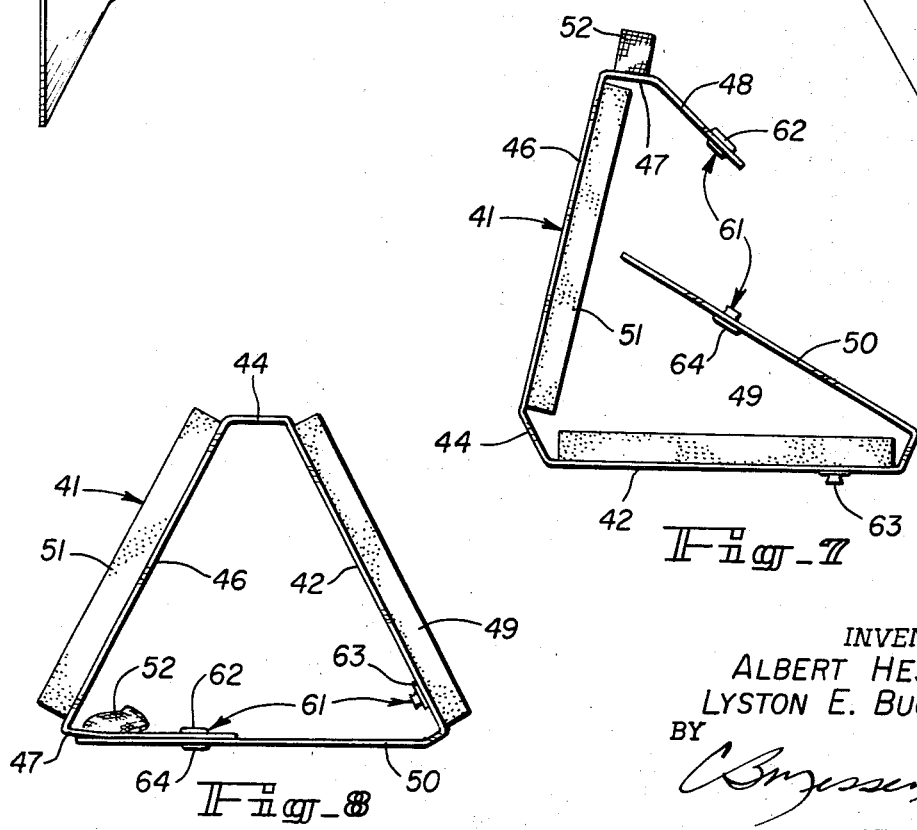

FISHING EQUIPMENT CARRIER

BACKGROUND OF THE INVENTION

Most fishermen who use lures or flies have difficulty in carrying and protecting such equipment. Previously others have provided various types of fly and lure holders that were in some measure designed to protect, segregate and display items of fishing equipment so that an easy selection could be made. In general prior arrangements have attempted to make it more convenient to store, select, use and replace selected items of equipment. Various systems have been used in previous attempts to make such equipment more convenient to carry or to use. In addition to convenience of use, the protection of fishing equipment has been of major concern. Since the conditions of field usage are quire varied, there are many factors that could be considered in connection with the design and provision of a satisfactory lure or fly carrier.

In addition to protection of the equipment from rain and brush or similar outdoor hazards, others have previously recognized the advantage of making the fishing equipment support of lightweight construction to ease carrying operations, and in some instances, to provide a flotation capability that will prevent loss of the carrier when the fisherman is involved in boating, wading or bankside fishing operations.

SUMMARY OF THE INVENTION

The present invention provides a different approach and solution to some of the objectives recognized by earlier inventors by providing a folding cover type of carrier that is manufactured of durable materials that are individually water and weather resistant. The folding cover structure supports a plurality of pads of soft foam material that are adapted to receive and securely hold the hooks of artificial flies and lures. The pads are of a size to conveniently receive and hold a plurality of hook structures that may be applied to the foam pad in spaced positions assuring noninterference between the fly or lure components. The pads may be of sculpted contour to at least partially enclose the fishing equipment so that a pair of pads may be brought into face to face position without causing damage to the flies or lures on the separate pads. The soft foam which protects the lures and the cover elements are of a lightweight material to provide a flotation capability for the completed structure so that the carrier will support and float a considerable quantity of lures that might be stored therein. The cover structure and pads are cooperatively arranged with respect to a multi-element fastener so the carrier can be closed and held in a closed configuration when the lures are being carried or stored. When the equipment is being used, the cover position is changed to hold the pads and the lures or flies attached thereto in a display type configuration so that selection of equipment is facilitated. The fastener system that is used to enclose the unit is also to be used to hold the unit in its display configuration when the fastener combination is reversed.

BRIEF DESCRIPTION OF THE DRAWINGS

FIG. 6 is a perspective drawing showing a second embodiment in open position, FIG. 7 is an end elevation at reduced scale showing the disposition of the components of the second embodiment when partially folded, and FIG. 8 is an end elevation in reduced scale showing the open display configuration for this second embodiment of the invention.

DESCRIPTION OF THE PREFERRED EMBODIMENTS

Figure 1:
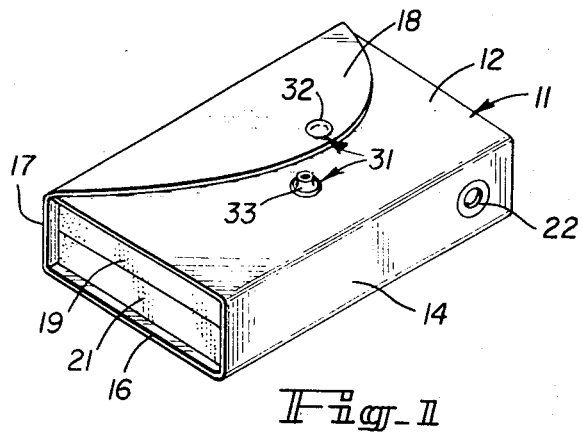
FIG. 1 is a perspective view showing a first embodiment of the invention in near closed relation.
Figure 3:
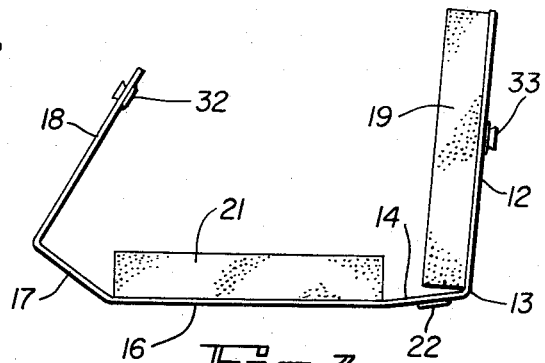
FIG. 3 is an end elevation showing the disposition of the components when partially folded.

The first embodiment as shown in FIGS. 1–5 provides a lure carrier 11 that is of a size to be carried in a fishing jacket or attached to the wearing apparel of the fisherman. The carrier has an external cover made up of several sections hinged one to the other. A front cover 12 is hinged at 13 to a spacer 14. The spacer is joined to a back cover 16. A hinge piece 17 and a cover flap 18 complete the enclosing structure.

Figures 4, 5:
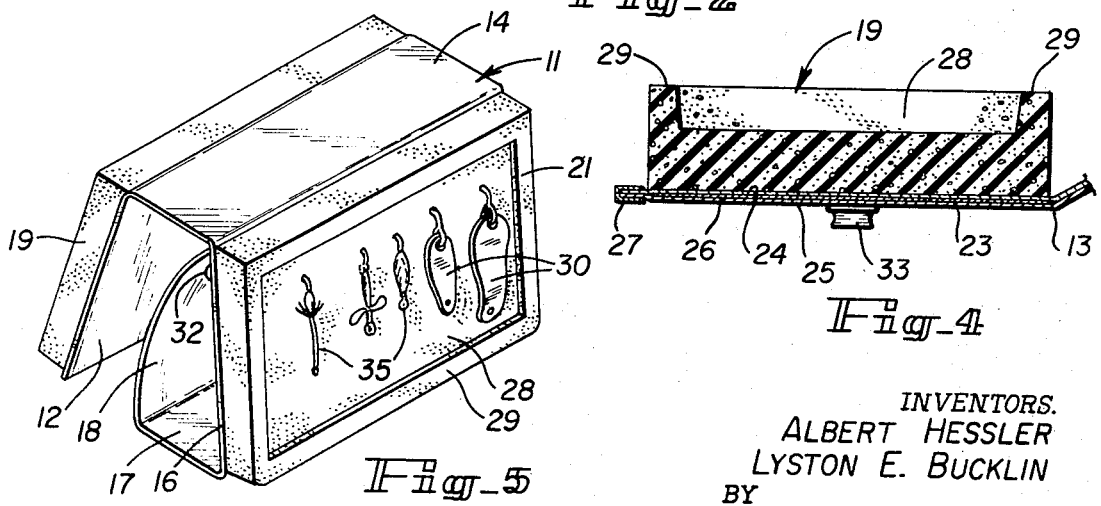
FIG. 4 is a partial cross-section taken along the line 4—4 of FIG. 2.
FIG. 5 is a perspective view showing a first embodiment in an open display configuration.

A foam pad 19 is disposed inwardly on the front cover 12 and is joined thereto by stitching or cements. A back foam pad 21 is similarly applied to the back 16. A grommet 22 may be disposed in the spacer 14 so that a cord may be strung therethrough if the carrier 11 is to be worn externally on the fisherman's person. As shown in FIG. 4, all of the cover structure 12–18 is covered with a water-resistant type fabric 23 applied to inner face 24 and outer face 25 of the structure. The interior thus enclosed is preferably inclusive of a stiffening member 26 that will provide form and support for the cover itself and for the carrier 11. Such stiffener, however, should still have some resilience so that it will in use conform to body contours. A binding tape 27 may be sewed to free edges of the construction to join the inner and outer fabrics. Stiffener element 26 is preferably discontinuous so that the fabric elements 23 will provide the desired hinge component.

In preferred usage all of the elements described should be of a water-resistant and lightweight material so that the carrier itself will float. The soft foam pads 19 and 21, however, are of a material that is extremely lightweight, and accordingly, the entire carrier has a substantial flotation characteristic. The pads 19 and 21 may be made of a soft rubber foam or of urethane or the like. Preferably a closed cell type of expanded material is preferable. A pliable and resilient product is desired in place of the rigid type foam plastics that have been used in previous lure boxes and carriers.

For this embodiment of the invention the pads 19 and 21 move into face to face positions when the carrier is closed. If the lures are disposed on the faces of these pads, the lures might come into contact one with the other when the carrier is closed. In order to prevent entanglements and further to protect and preserve the lures or flies being carried, the pads have a depression 28 in central position providing a relieved area with respect to the face edges 29. When the lures or flies are positioned in this relieved or cupped area 28, there is little contact between equipment on one pad and the other. Further, since each of the pads is of a soft pliable material, any interfering equipment will be gently held in position so that chaffing and interference will be minimized.

Figure 2:
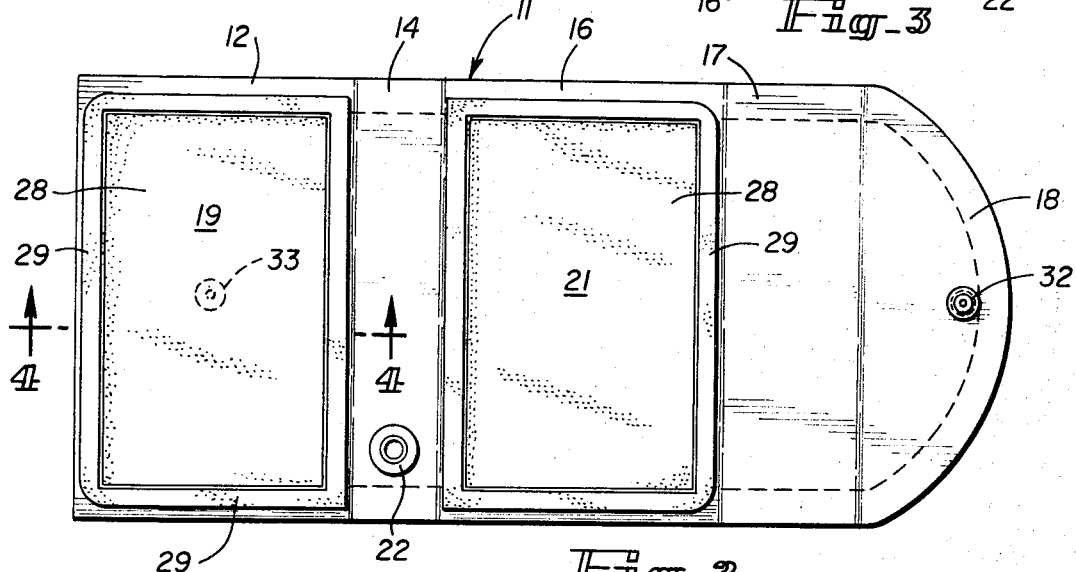
FIG. 2 shows the first embodiment in open relation.

The use of this embodiment of the invention is in part straightforward. When the cover is closed, the fishing equipment will be protected. If the carrier is opened to the position as shown in FIG. 2, any lures or flies disposed on the pads 19 or 21 will be exposed for convenient useage. The hooks of lures or flies can be pulled out of engagement with the foam or reapplied as lures are being changed. After use the cover can be closed, and a multi-element fastener 31 may be used to hold the cover in its closed configuration. Here a two-element fastener is made up of a snap 32 and a catch 33. As illustrated, the fastener element 31 may be a common snap type fastener. The positioning of fastener components is of importance, however, inasmuch as a further use is made thereof. As shown in FIG. 5, the carrier unit 11 may be fully opened with the foam pads 21 and 19 bent backwardly away from spacer 14. The positioning of hinge piece 17 and cover flap 18 may then also be reversed, and the snap 32 may again be engaged with the catch 33 to hold the carrier 11 in the opened display position illustrated by FIG. 5. When in this opened or A frame type position, lures 30 or flies 35 will all be displayed for convenient useage, and they will be held sturdily in such configuration by carrier 11 acting as a tripod support for the pads and lures. This usage configuration is particularly advantageous when the unit is being used in boats or at other fixed type locations.

A second embodiment of the invention is shown in FIGS. 6–8. The construction provided by this second embodiment is in general suitable for a larger type carrier that may be used to carry a greater number of lures or flies. In this embodiment the carrier 41 has a cover construction that is similar to that previously described. Stiffener elements covered by fabric covers in the manner shown and illustrated in FIG. 4 provide a cover structure inclusive of front cover 42, spacer 44 and a back cover 46 that is joined by hinge piece 47 to cover flap 48.

A divider 50 is joined to front cover 42 for interposition between the foam pads 49 and 51 when the carrier unit 41 is to be used in the closed or carrying configuration. A carrying handle 52 of flexible strap material is sewed to the hinge piece 47 so that it may be conveniently grasped by the user when the carrier is in the closed configuration. As suggested by FIG. 7, the divider 50 is moved to positions between the pads 49 and 51, and the flap 48 is extended about front cover 42 so that the snap 62 of the multi-element fastener 61 may be engaged to catch 63. When closed in this manner, the carrier 41 provides a secure unit that will hold and protect lures 60 and flies 65.

As with the previous embodiment, this carrier unit may be moved to a self-supporting display configuration as shown in FIG. 8. In this configuration the snap 62 of the three-element fastener 61 is engaged to auxiliary snap 64 which is disposed on the divider piece 50.

The A frame type support provided when the carrier is in this configuration makes usage of the carrier 41 when aboard a boat or at any other fixed type fishing location very handy and convenient.

As in the previous embodiment, the foam pads 49 and 51 are preferably of a soft closed cellular type material that will provide considerable flotation for the unit if it happens to be lost in the water.

We claim:

1. A fishing equipment carrier for usage when carrying and displaying fish lures and the like comprising a support cover including first and second cover components, pads of resilient low specific gravity material providing a flotation capability for said carrier mounted on interior surfaces of said first and second cover components and adapted to receive and enfold said fish lures, cover flap means attached to said support cover, said cover flap means including a divider element hingedly joined to said support cover for interpositioning between the pads of said carrier for preventing interference between lures disposed on said pads, hinge elements for said support cover interconnecting said first and second cover components and said cover flap means to provide an enclosure for enfolding said pads and the lures disposed thereon when the carrier is in a closed position, and multi-element fastener means for said carrier, said fastener means including snap and catch elements mounted on said support cover and cover flap means for cooperative two-position engagement with double usage of at least one of said fastener elements for securely holding said carrier about said lures in a first, closed position with the interior surfaces of said support cover and said pads disposed inwardly and protected, and for holding said covers, pads and lures in a second free standing A frame position with the interior surfaces of said support cover and said pads exposed when in the second position.

2. The carrier set forth in claim 1 wherein said pads are of closed cellular foam material and said support cover is of low specific gravity material providing cooperatively with said pads a flotation capability for said carrier.

3. The carrier set forth in claim 1 wherein the multi-element fastener means includes a snap on said cover flap means and two separate catches with a first catch disposed on the exterior surface of said first support cover component and a second catch disposed on the exterior surface of said divider whereby the snap and first catch hold the carrier in the closed position and the snap and second catch hold the carrier in the second A frame display position.

4. Structure as set forth in claim 1 and further comprising a relieved surface for said pads in position centrally of the edges of said pad to provide a lure protecting lip.

* * * * *